Nov. 15, 1960
W. C. NELSON
2,960,654
ELECTRICAL LEAKAGE TESTER
Filed June 19, 1957
2 Sheets-Sheet 1
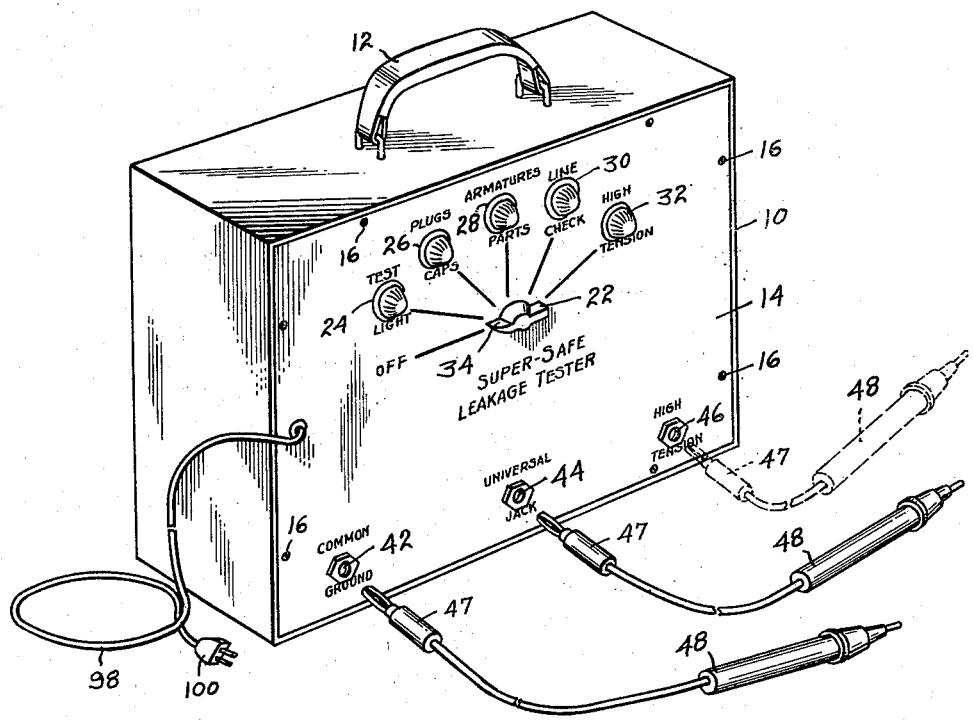
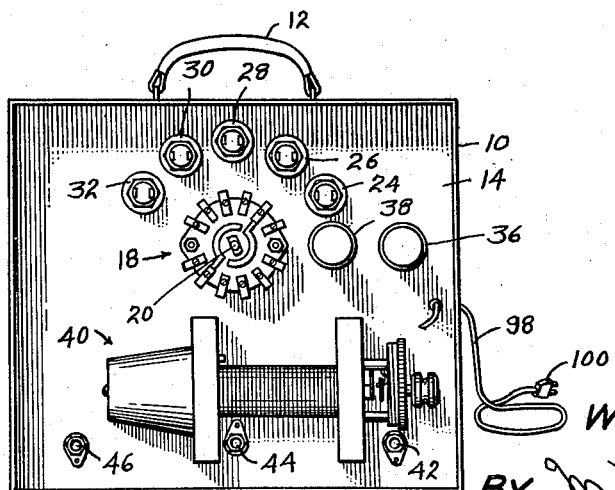
INVENTOR.
WESLEY C. NELSON
BY *Morton S. Adler*
ATTORNEY.

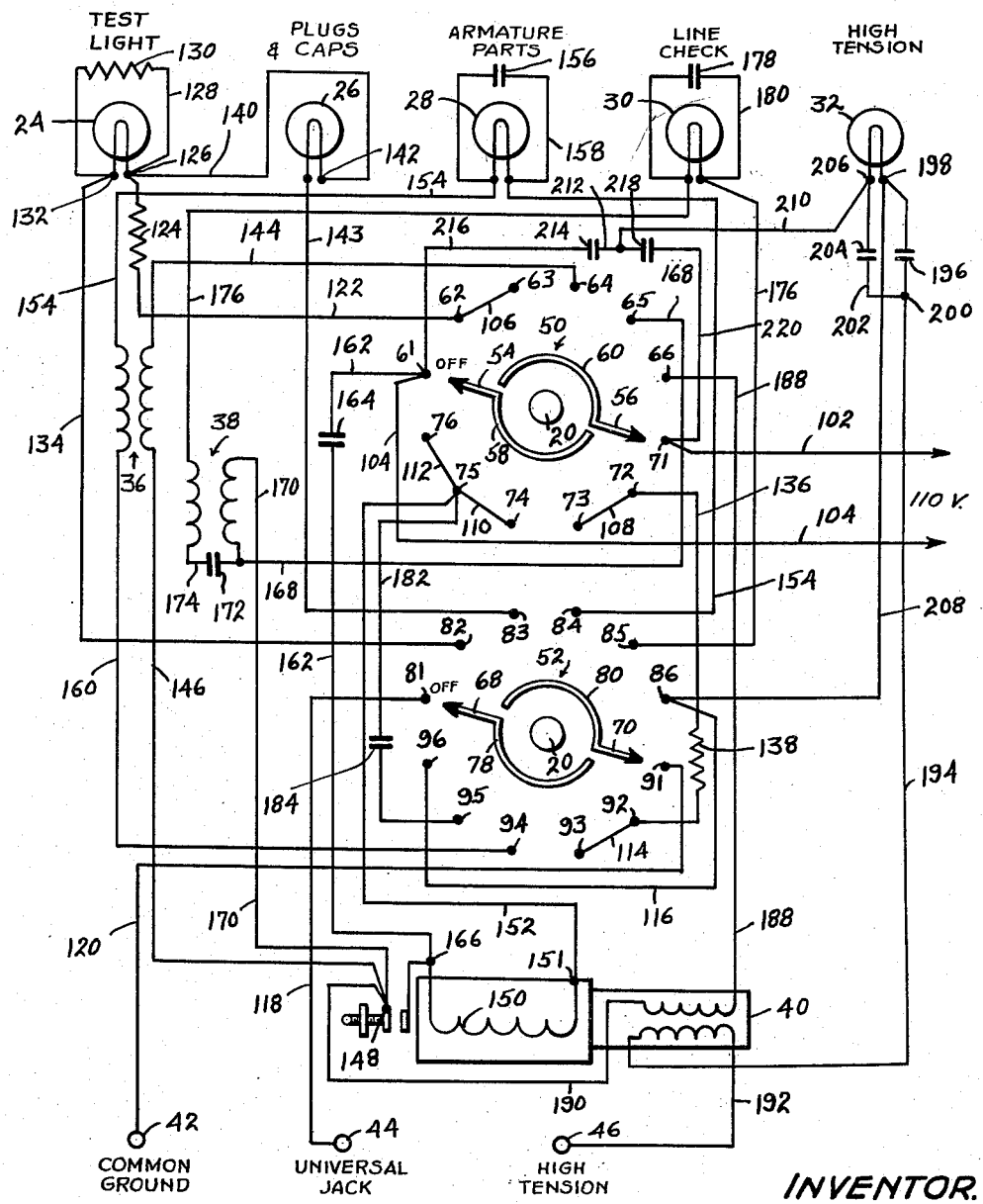

United States Patent Office 2,960,654
Patented Nov. 15, 1960

2,960,654

ELECTRICAL LEAKAGE TESTER

Wesley C. Nelson, P.O. Box 362, Waterloo, Iowa

Filed June 19, 1957, Ser. No. 666,638

6 Claims. (Cl. 324—73)

My invention relates to electrical testing apparatus suitable for testing electrical systems and equipment used in automobiles, trucks, tractors, airplanes and other gasoline powered engines.

It is one of the important objects of this invention to provide a new and improved apparatus for testing electric circuits and equipment and which is capable of accurately indicating the condition of a good part even though such part may be damp or wet. In other words, this tester will not register a good part in the primary circuit as bad because it may be damp or wet at the time of the test.

Another object of this invention is to provide an electrical tester of the above class capable of buzzing or sparking out grounds and shorts in the circuit or in defective parts therein without being dangerous for the operator and without damaging any of the good parts in the system. More particularly in this respect it is another object herein to provide with testing apparatus of the above character a coreless high frequency coil working in conjunction with vibrating points to give off suitable voltage with a current of below six milliamps of 110 volt A.C. or 110 volt A.C. feed back into any high frequency circuit with the result that there is no danger whatsoever from shock or burn to the operator if used properly.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings in which:

Fig. 1 is a front perspective view showing a preferred embodiment of this tester.

Fig. 2 is an elevational view of the rear or inner side of the front face of this tester shown in Fig. 1 to illustrate the arrangement of parts thereon, and, Fig. 3 is a diagrammatic view of the electrical circuits employed with this apparatus.

Referring to the drawings a case or cabinet 10 for housing the parts to be described is of a suitable size and weight to permit of its easy portability from place to place for general use and for this purpose includes the carrying handle 12. A front face or panel 14 is removably attached to the case 10 by means of screws 16.

On the rear or inner side of panel 14 (Fig. 2) is mounted a double decked rotary switch of a well known type indicated generally at 18 which has the rotatable shaft 20 that projects forwardly through panel 14 to receive the operating knob 22 on the front of panel 14. Test indicating lights are mounted on panel 14 so that their respective bulbs project from the forward side thereof and their terminals project from the inner side for electrical connection to switch 18 and other parts as will be described. These test lights are labeled on panel 14 for their particular use and function and include a test light 24, plugs and caps 26, armature parts 28, line check 30 and high tension 32. Knob 22 includes a pointer 34 for cooperation with the several test light positions as shown in Fig. 1. Also mounted on the inner side of panel 14 are the voltage step-up coreless coils 36 and 38 and a high tension coil 40. Three test jack terminals equally spaced on panel 14 below knob 22 are designated common ground 42, universal jack 44 and high tension 46. These jacks open to the front of panel 14 and are adapted to receive a plug 47 of one of the test prods 48 in a well known manner.

Referring now to Fig. 3 the double decked switch 18 is of a type commercially available that is constructed and operates in a manner well known in the art but will be described generally to facilitate tracing the circuits to be later indicated. Switch 18 includes a first deck unit 50 and a second deck unit 52 disposed in longitudinal spaced relationship on shaft 20. Deck unit 50 has the oppositely disposed contact arms 54 and 56 integrally formed with the respective segments 58 and 60 which are mounted for rotation with shaft 20 and for slidable contact with current supply terminals in a well known manner. Also deck 50 includes a plurality of switch terminals 61–66 inclusive and 71–76 inclusive which are angularly spaced in a concentric relation about shaft 20 in such a manner that terminals 61 and 71, 62 and 72, 63 and 73, 64 and 74, 65 and 75 and 66 and 76 are radially opposite to each other. Arm 54 will operatively engage the respective terminals 61–66 inclusive and arm 56 will similarly engage the respective terminals 71–76 inclusive and upon rotation of shaft 20, arms 54 and 56 are simultaneously engaged with the radially opposite terminals as above described.

The second deck unit 52 is a duplicate in construction of the first deck 50 and includes the contact arms 68 and 70 integrally formed with the respective segments 78 and 80. Switch terminals on deck 52 are arranged as described for deck 50 and include the terminals 81–86 inclusive and 91–96 inclusive, with terminals 81 and 91, 82 and 92, 83 and 93, 84 and 94, 85 and 95 and 86 and 96 being radially opposite each other. Arm 68 is engageable with terminals 81–86 inclusive and arm 70 is engageable with terminals 91–96 inclusive and radially opposite terminals are simultaneously engaged by arms 68 and 70 upon rotation of shaft 20 the same as described for deck 50. In the arrangement of the two decks 50 and 52, the respective pairs of terminals 61 and 81, 62 and 82, 63 and 83, 64 and 84, 65 and 85, 66 and 86, 71 and 91, 72 and 92, 73 and 93, 74 and 94, 75 and 95 and 76 and 96 are opposite to each other longitudinally on shaft 20.

The off position for switch 18 is indicated by terminals 61 and 71 on deck 50 and by terminals 81 and 91 on deck 52. A cord 98 projecting from panel 14 for attachment to a 110 v. source of power by plug 100 has one wire 102 connected to terminal 71 and the other wire 104 connected to terminal 61. Certain of the terminal switches on the respective decks 50 and 52 are tied together as follows: on deck 50, terminals 62 and 63 by wire 106, terminals 72 and 73 by wire 108, and terminals 74, 75 and 76 by wire 110 between 74 and 75 and wire 112 between 75 and 76; on deck 52, terminals 92 and 93 are connected by wire 114, and terminals 86 and 96 by wire 116. Terminal 81 on deck 52 is connected to universal jack 44 by wire 118 and terminal 91 connects to common ground jack 42 by wire 120.

Knob 22 (Fig. 1) is rotated clockwise to register with the respective test light positions and in describing the circuits for each position the movement of the contact arms on decks 50 and 52 in Fig. 2 is in the same direction. It will be understood that the contact arm units 54 and 56 and 68 and 70 on the respective decks 50 and 52 are slidably connected in a well known manner (not shown) to current supply terminals 61 and 71, and 81 and 91 to provide continuity of electrical contact between such terminals and the other terminals as will be designated for different test positions. In such cases where the contact arms 54 and 56, and 68 and 70 are described as being rotated to terminals away from the off position terminals but where current moves to or from such off position terminals to other terminals, the current will be described as moving through the switch 18.

Test Light: On deck 50 arms 54 and 56 are engaged with the respective terminals 62 and 72, and on deck 52, arms 68 and 70 engage the respective terminals 82 and 92. This is the position for testing grounds and continuity in the wiring. Here the circuit comprises current from terminal 61 through the switch 18 to terminal 62 to wire 122 through resistor 124 to contact 126 on test light 24, shunted by wire 128 through resistor 130 to the other contact 132 of light 24, through wire 134 to terminal 82 and through switch 18 to terminal 81 and to universal jack 44 by wire 118. The circuit is completed by current passing from terminal 71 through the switch 18 to terminal 72, to wire 136 through resistor 138 to terminal 92, through switch 18 to terminal 91 and to common ground jack 42 through wire 120. Illumination of the test light 24 indicates continuity in the system being tested. This test light as disclosed is also a very good check for excessive resistance in the electrode of resistor spark plugs without interfering with it's use as an ordinary test light. With less than six milliamps across the leads, or from either lead to an earth ground, it is impossible to burn and damage the parts checked.

*Plugs and caps.*—This position is used for testing such items as plugs, rotor and caps for porous leaks and the arms on the respective decks are rotated so that terminals 63 and 73, and 83 and 93 are engaged as described above. In this circuit current comes from terminal 61 through switch 18 to terminal 63 (tied to 62) through line 122 and to point 126 on test light 24. A resistor 124 is in line 122. From point 126 the circuit continues through line 140 to point 142 on plug and caps light 26, through the light and through line 43 to terminal 83 and through the switch to terminal 81 and to universal jack 44 through line 118. The second side of the current from terminal 71 goes through the switch to terminal 73 (tied to 72) through line 136 with resistor 138 to terminals 93 and 92 tied together, through switch 18 to terminal 91 to the common ground 42. The plug and cap check is below six milliamps and will not burn or carbon track the caps, rotors or plugs checked for porous and moisture leaks. Some equipment has heretofore been made to locate such porous leaks, but due to high milliamps has proven dangerous to the operator.

*Armature parts.*—Here the contact arms 54 and 56 are engaged with terminals 64 and 74 and arms 68 and 70 are engaged with terminals 84 and 94. Current flows from terminal 64 through wire 144 to primary of coil 36 and from coil 36 through wire 146 to vibrating points 148 of coil 150, through the points and winds of the vibrating coil to point 151 to wire 152 and back to terminals 74, 75 and 76 which are tied together. From one side of the secondary of coil 36, wire 154 goes through test light 28 to connect with terminal 84. At light 28, the connection is partially shunted by condenser 156 in line 153 that connects with the contacts on the light. Terminal 84 connects through switch 18 to terminal 81 which connects to universal jack 44 by wire 118. The other side of the secondary of coil 36 is connected by wire 160 to terminal 94 which connects through the switch 18 to terminal 91 and from there to the common ground jack 42 by wire 120. Terminal 61 connects by wire 162 through condenser 164 to point 166 of vibrating coil 150. This armature parts check is one of the novel features of this invention. It has been an old electrical theory that high voltage would always follow moisture. In this regard I have developed a high voltage that will not show moisture. It is obtained in this circuit with the combination of the high frequency coil 150 with a small coil 36 that is coreless. While there are about 200 milliamps of high frequency and at a voltage equivalent to 650 to 700 volts of A.C., and with the light 28 partially shunted with a condenser 156, the test prods 48 can be placed in water and it will not light the light. This current being non penetrating, even with the high milliamps will not give a painful shock if touched. This circuit will, however, show an armature and smaller individual parts that have defective insulation to be bad, and will do it with the armature or part wet or dry. The good part will also show good, wet or dry. These results have been demonstrated in actual tests even to the satisfaction of those who initially held to the contrary theory above mentioned.

*Line check.*—Switch 18 is rotated for contact with terminals 65 and 75, and 85 and 95. Current from terminal 65 goes through wire 168 to one side of primary of coil 38 and from the other side of the primary through wire 170 to vibrating points 148, through the points and winds of the vibrating coil 150 to point 151 to wire 152 and back to terminals 74, 75 and 76 which are tied together. Point 166 on vibrating coil 150 connects by wire 162 through condenser 164 to terminal 61. One side of the secondary and primary of coil 38 has the condenser 172 in the connecting wire 174 and the other side of the secondary of coil 38 is connected to wire 176 that goes through light 30 to terminal 85. At light 30, the connection is partially shunted by condenser 178 in line 180 as shown. Terminal 85 connects through switch 18 to terminal 81 which connects to universal jack 44 by wire 118. Terminal 75, tied to 74 and 76 receives current through switch 18 from terminal 71 and connects by conductor 182 through condenser 184 to terminal 95 which connects through switch 18 to terminal 91 to wire 120 to common ground jack 42. The line check uses the same type of coreless coil 38 as the one 36 used in the armature parts check but with one side of the secondary tied through a condenser 172 to one side of the primary, through the light, switch and to one test prod and feeding back through the other prod through a condenser 178 and switch to the other primary. This gives an A.C. feedback into the secondary that gives more penetration so that it will check a line or combination of lines used in the automotive circuit and also a generator field. This penetration causes this circuit to show moisture but the light is only dim on wet parts. The light is very bright or jumpy on defective parts. This circuit will spark across defective insulation with a high pitched buzz that helps locate the spot. This circuit shows about 150 milliamps of high frequency and less than six milliamps of 110 volt A.C. feedback. On dry hands no shock is felt and on wet hands only a slight sensation is felt or the equivalent shock of the feedback from the 110 volt primary. This circuit will not burn or damage parts wet or dry and can also be used as a moisture check by one reasonably good at judging the brightness of the light.

*High tension.*—Switch 18 is rotated for contact with terminals 66 and 76, and 86 and 96. Current from terminal 66 goes through wire 188 to primary of high tension coil 40, through the primary in wire 190 to vibrating points 148, through the points and winds 150 of the vibrating coil to point 151 to wire 152 to terminal 76 tied to 74 and 75. Terminal 76 connects through switch 18 to terminal 71. Terminal 61 connects by wire 162 through condenser 164 to point 166. One side of the secondary of high tension coil 40 connects by wire 192 to the high tension jack 46. The other side of the secondary connects by wire 194 through condenser 196 to point 198 on the high tension light 32. Wire 194 is also tied at point 200 with wire 202 going through condenser 204 to point 206 on light. Current feeds back from the common ground jack 42 to terminal 91, through switch 18 to terminal 96, through conductor 116 to terminal 86, through wire 208 to point 198 of the high tension light 32 and through light 32 to wire 210. Wire 210 is connected to line 212 which connects in one direction through condenser 214 to line 216 that connects with terminal 61, and in the other direction through condenser 218 to line 220 that connects to terminal 71. This violet ray high tension coil 40 has been used for years for insulation breakdown testing but with one end of the secondary tied directly to one side of the primary. In that way there was straight 110 current fed through the secondary and if any one touched an earth ground they could get better than one ampere along with the high voltage and this has been known to be very dangerous. In this tester I have one end of the secondary run through a condenser 204 to the tie-in of the pair of condensers 214 and 218 across the primary lines and connected to side 206 of the high tension light 32, and in so doing I find that I have about one milliamp of A.C. feedback through this coil in place of over one ampere. At the same time I have placed another condenser 196 between the first end of the secondary and the opposite side 198 of the high tension light 32. Feedback from the common ground 42 comes through switch 18 to the side where the second condenser 196 is fastened and this second condenser carries part of the feedback to the coil 40 and allows part to travel through the light 32 to give proper indication and show if insulation being checked is good or bad. In this way I have a very adequate test for pin holes, hidden cracks, small invisible carbon tracks and like defects in coil and plug wires, distributor caps, rotors, coil towers and high tension magneto parts with the light showing good or bad while checking.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, and modified forms of structure or mechanical equivalents which may be reasonably included within their scope.

I claim:

1. Apparatus for testing continuity and leakage in electrical circuits, comprising, a source of alternating current supply, a pair of condensers in series between the leads of said supply, a first, second and third test jack terminal, a rotary switch having a first and second deck unit mounted upon a common rotatable shaft, means for rotating said shaft, one of said deck units connected to said current supply and the other wired for selective connection to any two of said jack terminals, a plurality of switch terminals on each deck unit angularly spaced in a concentric relation about said shaft to provide a plurality of pairs of terminals on each deck in which the terminals comprising each respective pair are radially opposite to each other, the terminals on one deck unit being axially opposite to corresponding terminals on the other deck unit, first, second, third, fourth and fifth test lights respectively connected between respective first, second, third, fourth and fifth pairs of axially opposite terminals on said deck units, a resistor across said first light, condensers across said respective third and fourth lights, a resistor connected across one set of axially opposite terminals of said respective first and second pair in series with said first light and the resistor across the same, a resistor across the other set of axially opposite terminals of said respective first and second pair, a primary coil of a first voltage step-up coreless coil and a vibrating coil respectively in series across said third pair of radially opposite terminals on one deck, one side of the secondary of said first coil connected through said third light to one of said terminals of said third pair on the other deck, the other side of said secondary of said first coil connected to the other terminal of said third pair on said other deck, a primary coil of a second voltage step-up coreless coil and said vibrating coil respectively connected across said fourth pair of radially opposite terminals on one deck, a condenser across one side of the primary and secondary of said second coil, the other side of the secondary of said second coil connected through said fourth light to said fourth pair of terminals on said other deck, a condenser across one set of axially opposite terminals of said fourth pair on said decks, the primary of a high tension coil and said vibrating coil connected across said fifth pair of radially opposite terminals on one deck, a condenser connecting said vibrating coil to the primary of said supply, one side of secondary of said high tension coil connected to said third jack, the other side of secondary of said high tension coil connected through a condenser to one side of said fifth light and to the current supply between said first mentioned pair of condensers and also connected through a condenser to the other side of said fifth light, and a pair of oppositely disposed switch arms on each deck unit movable simultaneously by said common shaft so that radially opposite pairs of terminals on one deck are in contact with the corresponding axially aligned radially opposite pairs of terminals on the other deck to vary the current supply across said jack terminals.

2. Apparatus for testing continuity and leakage in electrical circuits, comprising, a source of alternating current supply, a pair of condensers in series between the leads of said supply, a pair of test jack terminals, a rotary switch having a first and second deck unit mounted upon a common rotatable shaft, means for rotating said shaft, one of said deck units connected to said current supply and the other connected across said jack terminals, radially opposite switch terminals on each deck, the terminals on one deck unit being axially opposite to corresponding terminals on the other deck unit, a test light connected between axially opposite terminals on said deck units, a condenser across said test light, a primary coil of a voltage step-up coreless coil and a vibrating coil respectively in series across said pair of radially opposite terminals on one deck, one side of the secondary of said coil connected through said light to one of said terminals of said pair on the other deck, the other side of said secondary of said coil connected to the other terminal of said pair on said other deck, a condenser connecting said vibrating coil to said alternating current supply, and a pair of oppositely disposed switch arms on each deck unit movable simultaneously by said common shaft so that the radially opposite pair of terminals on one deck are in contact with the corresponding axially aligned radially opposite pair of terminals on the other deck to vary the current supply across said jack terminals.

3. Apparatus for testing continuity and leakage in electrical circuits, comprising, a source of alternating current supply, a pair of condensers in series between the leads of said supply, a pair of test jack terminals, a rotary switch having a first and second deck unit mounted upon a common rotatable shaft, means for rotating said shaft, one of said deck units connected to said current supply and the other connected across said jack terminals, radially opposite switch terminals on each deck, the terminals on one deck unit being axially opposite to corresponding terminals on the other deck unit, a test light connected between axially opposite terminals on said deck units, the primary of a high tension coil and a vibrating coil respectively connected in series across said pair of radially opposite terminals on one deck, one side of the secondary of said high tension coil connected to one of said jacks, the other side of the secondary of said high tension coil connected through a condenser to one side of said light and to the current supply between said first mentioned pair of condensers and also connected through a condenser to the other side of said light and a condenser connecting said vibrating coil to said alternating current supply.

4. Apparatus for testing continuity and leakage in electrical circuits, comprising, a source of alternating current supply, a pair of condensers in series between the leads of said supply, a pair of test jack terminals, a rotary switch having a first and second deck unit mounted upon a common rotatable shaft, means for rotating said shaft, one of said deck units connected to said current supply and the other connected across said jack terminals, radially opposite switch terminals on each deck, the terminals on one deck unit being axially opposite to corresponding terminals on the other deck unit, a test light connected between axially opposite terminals on said deck units, a condenser across said light, a primary coil of a voltage step-up coreless coil and a vibrating coil respectively connected in series across the pair of radially opposite terminals on one deck, a condenser across one side of the primary and secondary of said coil, the other side of the secondary of said coil connected through said light to said pair of terminals on said other deck, a condenser connecting said vibrating coil to said alternating current supply, a condenser across one set of axially opposite terminals on said decks, and a pair of oppositely disposed switch arms on each deck unit movable simultaneously by said common shaft so that the radially opposite pair of terminals on one deck are in contact with the corresponding axially aligned radially opposite pair of terminals on the other deck to vary the current supply across said jack terminals.

5. Apparatus for testing continuity and leakage in electrical circuits, comprising, a source of alternating current supply, a pair of condensers in series between the leads of said supply, a first, second and third test jack terminal, a rotary switch having a first and second deck unit mounted upon a common rotatable shaft, means for rotating said shaft, one of said deck units connected to said current supply and the other wired for selective connection to any two of said jack terminals, switch terminals on each deck unit angularly spaced in a concentric relation about said shaft to provide a plurality of pairs of terminals on each deck in which the terminals comprising each respective pair are radially opposite to each other, the terminals on one deck unit being axially opposite to corresponding terminals on the other deck unit, a first and second test light respectively connected between respective first and second pairs of axially opposite terminals on said deck units, a condenser across said first light, a primary coil of a voltage step-up coreless coil and a vibrating coil respectively in series across said first pair of radially opposite terminals on one deck, one side of the secondary of said coil connected through said first light to one of said terminals of said first pair on the other deck, the other side of said secondary of said coil connected to the other terminal of said pair on said other deck, the primary of a high tension coil and said vibrating coil connected across said second pair of radially opposite terminals on one deck, one side of the secondary of said high tension coil connected to said third jack, the other side of secondary of said high tension coil connected through a condenser to one side of said second light and to the current supply between said first mentioned pair of condensers and also connected through a condenser to the other side of said second light, a condenser connecting said vibrating coil to said alternating current supply, and a pair of oppositely disposed switch arms on each deck unit movable simultaneously by said common shaft so that radially opposite pairs of terminals on one deck are in contact with the corresponding axially aligned radially opposite pairs of terminals on the other deck to vary the current supply across said jack terminals.

6. Apparatus for testing continuity and leakage in electrical circuits, comprising, a source of alternating current supply, a pair of condensers in series between the leads of said supply, a first, second and third test jack terminal, a rotary switch having a first and second deck unit mounted upon a common rotatable shaft, means for rotating said shaft, one of said deck units connected to said current supply and the other wired for selective connection to any two of said jack terminals, a plurality of switch terminals on each deck unit angularly spaced in a concentric relation about said shaft to provide a plurality of pairs of terminals on each deck in which the terminals comprising each respective pair are radially opposite to each other, the terminals on one deck unit being axially opposite to corresponding terminals on the other deck unit, first, second, third, fourth, and fifth test lights respectively connected between respective first, second, third, fourth and fifth pairs of axially opposite terminals on said deck units, a resistor across said first light, condensers across said respective third and fourth lights, a resistor connected across one set of axially opposite terminals of said respective first and second pair in series with said first light and the resistor across the same, a resistor across the other set of axially opposite terminals of said respective first and second pair, a primary coil of a first voltage step-up coreless coil and a vibrating coil respectively in series across said third pair of radially opposite terminals on said first deck, the secondary of said first coreless coil connected in series with said third light across said third pair of radially opposite terminals on said second deck, a primary coil of a second voltage step-up coreless coil and said vibrating coil respectively connected across said fourth pair of radially opposite terminals on said first deck, a condenser across one side of the primary and secondary of said second coreless coil, the other side of the secondary of said second coreless coil connected through said fourth light to said fourth pair of terminals on said second deck, a condenser across one set of axially opposite terminals on said fourth pair on said decks, the primary of a high tension coil and said vibrating coil connected across said fifth pair of radially opposite terminals on said first deck, one side of secondary of said high tension coil connected to said third jack, the other side of secondary of said high tension coil connected through a condenser to one side of said fifth light and to the current supply between said first mentioned pair of condensers and also connected through a condenser to the other side of said fifth light, a condenser connecting said vibrating coil to said alternating current supply, and a pair of oppositely disposed switch arms on each deck unit movable simultaneously by said common shaft so that radially opposite pairs of terminals on one deck are in contact with the corresponding axially aligned radially opposite pairs of terminals on the other deck to vary the current supply across said jack terminals.

References Cited in the file of this patent
UNITED STATES PATENTS
2,712,634     Briner _____ July 5, 1955